US009853320B2

(12) United States Patent
Sheem et al.

(10) Patent No.: US 9,853,320 B2
(45) Date of Patent: Dec. 26, 2017

(54) POSITIVE ACTIVE MATERIAL FOR RECHARGEABLE LITHIUM BATTERY AND RECHARGEABLE LITHIUM BATTERY INCLUDING SAME

(75) Inventors: Kyeu-Yoon Sheem, Yongin-si (KR); Sumihito Ishida, Yongin-si (KR); Bok-Hyun Ka, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 181 days.

(21) Appl. No.: 13/011,975

(22) Filed: Jan. 24, 2011

(65) Prior Publication Data
US 2011/0274973 A1 Nov. 10, 2011

(30) Foreign Application Priority Data
May 6, 2010 (KR) .................. 10-2010-0042556

(51) Int. Cl.
*H01M 4/131* (2010.01)
*H01M 4/52* (2010.01)
*H01M 4/525* (2010.01)
*H01M 10/0525* (2010.01)
*H01M 4/36* (2006.01)
*H01M 4/505* (2010.01)
*H01M 4/587* (2010.01)
*H01M 4/02* (2006.01)

(52) U.S. Cl.
CPC ....... *H01M 10/0525* (2013.01); *H01M 4/364* (2013.01); *H01M 4/505* (2013.01); *H01M 4/525* (2013.01); *H01M 4/587* (2013.01); *H01M 2004/028* (2013.01)

(58) Field of Classification Search
CPC ........ H01M 4/02; H01M 4/131; H01M 4/362; H01M 4/466; H01M 4/52; H01M 4/525; H01M 4/625
USPC .......... 429/220, 223–224, 231, 231.5, 231.6, 429/231.8, 221
See application file for complete search history.

(56) References Cited

U.S. PATENT DOCUMENTS

| | | | | |
|---|---|---|---|---|
| 5,238,760 A | * | 8/1993 | Takahashi et al. | ......... 429/231.8 |
| 6,099,960 A | * | 8/2000 | Tennent et al. | ............. 428/367 |
| 6,517,972 B1 | | 2/2003 | Amatucci | |
| 6,855,273 B2 | | 2/2005 | Ravet et al. | |
| 8,148,002 B2 | * | 4/2012 | Nagai et al. | ................ 429/136 |

(Continued)

FOREIGN PATENT DOCUMENTS

| | | |
|---|---|---|
| CN | 101682025 A | 3/2010 |
| EP | 2131422 | 12/2009 |

(Continued)

OTHER PUBLICATIONS

The Korean Office action issued by Korean Patent Office dated Sep. 30, 2011, corresponding to KR 10-2010-0042556 and Request for Entry attached herewith.

(Continued)

*Primary Examiner* — Ula C Ruddock
*Assistant Examiner* — Thomas Parsons
(74) *Attorney, Agent, or Firm* — Robert E. Bushnell, Esq.

(57) ABSTRACT

The positive active material for a rechargeable lithium battery includes a composite material of a microporous carbon-based material and a lithium composite compound and a carbon layer on the surface of the composite material.

10 Claims, 2 Drawing Sheets

(56) References Cited

U.S. PATENT DOCUMENTS

| | | | |
|---|---|---|---|
| 8,574,759 B2* | 11/2013 | Atsuki et al. | 429/231.8 |
| 8,808,916 B2* | 8/2014 | Kim | H01M 4/364 |
| | | | 427/126.1 |
| 2006/0210879 A1 | 9/2006 | Kawasato et al. | |
| 2010/0075229 A1 | 3/2010 | Atsuki et al. | |

FOREIGN PATENT DOCUMENTS

| | | | |
|---|---|---|---|
| JP | 2000-208147 A | | 7/2000 |
| JP | 3223523 | | 8/2001 |
| JP | 2001250553 | | 9/2001 |
| JP | 2003109599 | | 4/2003 |
| JP | 2003303588 | | 10/2003 |
| JP | 2004103546 | | 4/2004 |
| JP | 2004-220909 A | | 8/2004 |
| JP | 2008270204 | | 11/2008 |
| JP | 2009054318 | * | 3/2009 |
| KR | 10-2004-0071852 | | 8/2004 |
| KR | 10-2007-0059718 A | | 6/2007 |
| KR | 10-2008-0029479 | | 4/2008 |
| KR | 10-2010-0015324 A | | 2/2010 |
| WO | WO2008123444 | * | 10/2008 |
| WO | WO-2009/105863 A1 | | 9/2009 |
| WO | 2010012076 | | 2/2010 |

OTHER PUBLICATIONS

Japanese Office Action issued by JPO dated Oct. 2, 2012 in connection with Japanese Patent Application No. 2010-230438 which claims Korean Patent Application No. 10-2010-0042556 as its priority document and Request for Entry of the Accompanying Office Action attached herewith.

The Chinese Office Action issued by SIPO dated May 29, 2013 in connection with the Chinese Patent Application serial No. 201110122146.X, which corresponds to the Korean Patent Application No. 10-2010-0042556.

Japanese Office Action dated Apr. 16, 2013 by JPO in connection with Japanese Patent Application No. 2010-230438, which also claims Korean Patent Application No. 10-2010-0042556 as its priority document and Request for Entry of the Accompanying Office Action attached herewith.

The Chinese Office Action issued by SIPO dated Nov. 8, 2013 in connection with Chinese Patent Application No. 201110122146.X which corresponds to Korean Patent Application No. 2010-0042556.

The Chinese Decision of Rejection issued by SIPO dated Apr. 14, 2014 in connection with Chinese Patent Application No. 201110122146.X which also claims Korean Patent Application No. 2010-0042556 as its priority document.

SIPO Notification of of Reexamination dated Dec. 5, 2014 in connection with Chinese Patent Application No. 201110122146.X which also claims Korean Patent Application No. 2010-0042556 as its priority document.

SIPO Decision of Rejection dated Mar. 16, 2015 in connection with Chinese Patent Application No. 201110122146.X.

EPO OA dated Apr. 5, 2016 for Application No. 11250507.8.

* cited by examiner

POSITIVE ACTIVE MATERIAL FOR RECHARGEABLE LITHIUM BATTERY AND RECHARGEABLE LITHIUM BATTERY INCLUDING SAME

RELATED APPLICATIONS

This application claims priority to and the benefit of Korean Patent Application No. 10-2010-0042556 filed in the Korean Intellectual Property Office on May 6, 2010, the entire contents of which are incorporated herein by reference.

BACKGROUND

1. Field

This disclosure relates to a positive active material for a rechargeable lithium battery and a rechargeable lithium battery including the same.

2. Description of the Related Art

Lithium rechargeable batteries have recently drawn attention as a power source for small portable electronic devices. They use an organic electrolyte solution and thereby have twice the discharge voltage of a conventional battery using an alkaline aqueous solution, and accordingly have high energy density.

As for positive active materials for a rechargeable lithium battery, lithium-transition element composite oxides being capable of intercalating lithium, for example, $LiCoO_2$, $LiMn_2O_4$, $LiNi_{1-x}Co_xO_2$ (0<x<1), and the like, have been researched.

As for negative active materials for a rechargeable lithium battery, various carbon-based materials that may all intercalate and deintercalate lithium ions, for example, artificial graphite, natural graphite, and hard carbon, a metal-based material such as Si, and the like, or a lithium composite compound such as lithium vanadium oxide, have been used.

SUMMARY

One exemplary embodiment of the present invention provides a positive active material for a rechargeable lithium battery having excellent conductivity, and thus excellent high power characteristics.

Another embodiment of the present invention provides a rechargeable lithium battery including the positive active material.

Still another embodiment of the present invention provides a positive active material for a rechargeable lithium battery including a composite material of a microporous carbon-based material and a lithium composite compound, and a carbon layer on the surface of the composite material.

The porous carbon-based material may include activated carbon, carbide derived carbon (CDC), carbon nanotubes, carbon nanofiber, expanded carbon, expanded graphite, or a combination thereof.

The microporous carbon-based material may have an average particle size (D50) ranging from about 100 nm to about 10 μm. The microporous carbon-based material may have a specific surface area ranging from about 50 $m^2/g$ to about 3000 $m^2/g$.

The lithium composite compound may have an average particle size (D50) ranging from about 100 nm to about 10 μm.

The carbon layer may be about 1 nm to about 500 nm thick. The carbon layer may be included in an amount ranging from about 1 wt % to about 30 wt % based on the entire weight of the active material.

The positive active material may further include a conductive material. Herein, the conductive material may be carbon black, carbon nanotubes, carbon nanofiber, vapor-grown carbon fiber (VGCF), carbon powder, graphite powder, or a combination thereof. The conductive material may be included in an amount ranging from about 1 to about 5 parts by weight based on 100 parts by weight of the composite material.

The lithium composite compound includes $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_bMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a≤1.8, 0.001≤b≤0.1); $Li_aMnG_bO_2$ (0.90≤a≤1.8, 0.001b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$. In the above formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

According to another embodiment of the present invention, provided is a rechargeable lithium battery including a negative electrode including a negative active material, a positive electrode including a positive active material, and a non-aqueous electrolyte.

The active material for a rechargeable lithium battery according to one embodiment of the present invention may have remarkable conductivity, and thus has excellent high power characteristics.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1:
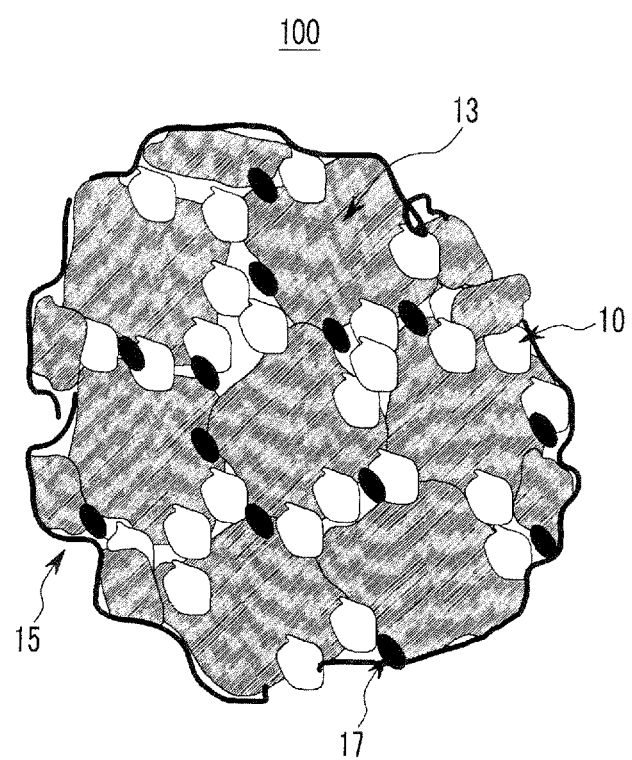
FIG. 1 is a drawing that shows the structure of a positive active material according to one embodiment of the present invention.

Exemplary embodiments of the present invention will hereinafter be described in detail. However, these embodiments are only exemplary, and the present invention is not limited thereto.

One embodiment of the present invention provides a positive active material for a rechargeable lithium battery. The positive active material includes a composite material, and a carbon layer formed partially or entirely on the surface of the composite material. The composite material includes a microporous carbon-based material and a lithium composite compound.

The composite material refers to a particle where a microporous carbon-based material and a nano-sized lithium composite compound are agglomerated together. The composite material is a large secondary particle in which primary minute particles are agglomerated together.

The microporous carbon-based material may include activated carbon, carbide derived carbon (CDC), carbon nanotubes, carbon nanofiber, expanded carbon, expanded graphite, or a combination thereof.

The microporous carbon-based material may have an average particle size (D50) ranging from 100 nm to 10 µm. In addition, the microporous carbon-based material may have a specific surface area ranging from about 50 m$^2$/g to about 3,000 m$^2$/g. The D50 is the size at which half of the individual active material particles (by weight) are smaller than the specified diameter.

The lithium composite compound may have an average particle size (D50) ranging from about 100 nm to about 10 µm or less.

In the positive active material, the lithium composite compound and the microporous carbon-based material may be mixed in a ratio ranging from 99:1 wt % to 70:30 wt %, or from 99:1 wt % to 80:20 wt % in another embodiment. When they are mixed within the ratio range, the microporous carbon-based material may bring about appropriate effects.

The carbon layer may be included in an amount ranging from 1 wt % to about 49 wt % based on the entire weight of the positive active material. When the carbon layer is included within the range, it may not resist against diffusion of lithium ions and may improve conductivity.

The carbon layer on the surface of the composite material may be about 1 nm to about 500 nm thick, or about 5 nm to about 300 nm in another embodiment. When the carbon layer is included within the thickness range, it may not resist against diffusion of lithium ions but may improve conductivity.

In the embodiment of the present invention, the positive active material may further include a conductive material. Herein, the conductive material may include carbon black, carbon nanotubes, carbon nanofiber, vapor-grown carbon fiber (VGCF), carbon powder, graphite powder, or a combination thereof.

The conductive material may be included in an amount ranging from about 1 to about 5 parts by weight based on 100 parts by weight of the composite material. When the conductive material is included within the range, it may bring about appropriate conductivity.

In one embodiment, the lithium composite compound may include $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}$ $D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α2); $Li_aN_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_c$-$Mn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_a$-$CoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$. In the above formulas, A is selected from the group consisting of Ni, Co, Mn, and a combination thereof; X is selected from the group consisting of Al, Ni Co, Mn, Cr, Fe, Mg, Sr, V, a rare earth element, and a combination thereof; D is selected from the group consisting of O, F, S, P, and a combination thereof; it E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

FIG. 1 comprehensively shows a positive active material according to one embodiment of the present invention. FIG. 1 shows a structure of the positive active material additionally including a conductive material, but the positive active material according to one embodiment of the present invention is not limited to as illustrated above. As shown in FIG. 1, a positive active material 100 according to one embodiment of the present invention may include a composite material of a lithium composite compound 10 and a microporous carbon-based material 13 with a carbon layer 15 on the surface thereof. In addition, the composite material may further include a conductive material 17.

In this way, a positive active material according to one embodiment of the present invention may not be a simple mixture of a microporous carbon-based material and a lithium composite compound, but is that by agglomerating the microporous carbon-based material and the lithium composite compound to form a composite material and bonding by a carbon layer on the surface thereof. Accordingly, a microporous carbon-based material is sufficiently present around a lithium composite compound, thereby providing excellent conductivity.

In addition, since an electrolyte solution may impregnate to the pores of the microporous carbon-based material, it may provide abundance of the electrolyte solution around the lithium composite compound. Furthermore, since the microporous carbon-based material is charged by negative ions of the electrolyte solution and a lithium salt, it may in general have abundant negative energy and thereby decrease electrochemical resistances generated when lithium positive ions intercalate and deintercalate at the interface of a positive active material.

In addition, since the microporous carbon-based material and the lithium composite compound are fine materials having a micrometer size or less, they may shorten a path through which lithium ions are diffused while the microporous carbon-based material has excellent lithium ion adsorption power, and may thus make high rate charge and discharge possible. Accordingly, the positive active material prepared based on these materials may be applied to a high power rechargeable lithium battery.

According to another embodiment of the present invention, the positive active material for a rechargeable lithium battery is prepared in the following exemplary method.

First of all, a lithium composite compound is mixed with a microporous carbon-based material. The lithium composite compound and the carbon-based material may be mixed in a ratio ranging from about 99:1 wt % to about 70:30 wt %, or from about 99:1 wt % to about 80:20 wt % in another embodiment.

The lithium composite compound may include a commercially-available lithium composite compound or may be prepared by mixing a lithium salt, a metal salt, and the like in a solvent, and then drying and heat-treating the mixture in a sol-gel process.

The lithium salt, the metal salt, and the like may include any compound used for preparing a lithium composite compound to have a desired composition. Examples of the lithium salt and the metal salt may include a hydroxide, an acetate, a nitrate, an oxide, and the like, but will not be illustrated in detail, since these are well-known in the related field. Examples of a solvent in the sol-gel process may include an ethylene glycol aqueous solution in which citric acid is dissolved. The citric acid may be mixed with ethylene glycol in an appropriately-regulated mole ratio.

The microporous carbon-based material may be commercially available or may be prepared by heat-treating a carbon precursor, grinding the heat-treated product, and activating the ground product. The carbon precursor may include coal pitch, petroleum pitch, mesophase pitch, tar, or a combination thereof.

The grinding process may be performed until the microporous carbon-based material has an average particle size (D50) ranging from 100 nm to 10 μm.

The activation process refers to a process in which an oxidation reaction of carbon occurred at a temperature ranging from about 800° C. to about 1,000° C., may cause the corrosion of the surface of the carbon, thereby developing micropores. This activation may be performed by contacting the heat-treated product with $CO_2$ gas. Herein, the contacting time may be appropriately regulated.

Alternatively, the activation may be performed by mixing the heat-treated product with a strong alkaline compound such as KOH, NaOH, and the like, heat-treating the mixture under an inert atmosphere at a temperature ranging from 800° C. to 1,000° C., and washing the resulting product with water. The heat-treated product and the strong alkaline compound are mixed in a ratio ranging from 90:10 wt % to 50:50 wt %. The inert atmosphere may include a nitrogen atmosphere, an argon atmosphere, or a combination thereof.

Next, a binder solution is added to the mixture of a lithium composite compound and a microporous carbon-based material. The binder solution may include the binder and a solvent. Examples of the solvent include water, alcohols such as methanol, ethanol and propanol, or a combination thereof.

The binder may include a water-soluble polymer or an alcohol-soluble polymer, for example, carboxylmethyl cellulose, polyvinyl alcohol, polyvinylchloride, furfuryl alcohol, a phenol resin, or a combination thereof. Alternatively, the binder may include citric acid.

The binder solution may be mixed with an additional binder such as citric acid and the like that may remain after the heat treatment. The additional binder may be appropriately regulated in a used amount.

The binder solution may have a concentration ranging from 1 wt % to 20 wt % (i.e., a binder and a solvent are mixed in a ratio ranging from 1:99 wt % to 20:80 wt %). The binder solution may be added in an amount ranging from 1 to 20 parts by weight based on 100 parts by weight of the mixture (including the amount of an additional binder when the additional binder is used). When the additional binder is added within the range, it may bring about excellent electronic conductivity unless it resists against ion diffusion, and makes to easily form a composite material.

A conductive material may be added to the mixture of the lithium composite compound and the microporous carbon-based material. The conductive material may include carbon black, carbon nanotubes, carbon nanofiber, vapor-grown carbon fiber (VGCF), carbon powder, graphite powder, or a combination thereof. In addition, the conductive material may be included in an amount ranging from about 1 to about 5 parts by weight based on 100 parts by weight of the mixture of the lithium composite compound and the microporous carbon-based material.

The prepared mixture is spray-dried at a high temperature, preparing the composite material of a microporous carbon-based material and a lithium composite compound. The spray-drying process may be performed at a temperature ranging from 60° C. to 100° C. In the composite material, both of the microporous carbon-based material and the lithium composite compound may have an average particle size (D50) ranging from about 100 nm to about 10 μm.

Next, the composite material is heat-treated under an inert atmosphere to form a carbon layer on the surface thereof. The carbon layer may be derived from the binder according to the heat-treatment.

The heat treatment may be performed at a temperature ranging from about 500° C. to about 1,200° C. The inert atmosphere may be a nitrogen atmosphere, an argon atmosphere, or a combination thereof.

Alternatively, the positive active material according to one embodiment of the present invention may be prepared by a spray-pyrolysis or mechanical-dry agglomeration techniques. The spray-pyrolysis technique may include that the lithium composite compound, the microporous carbon-based material, and the binder solution are mixed and the resulting mixture is spray-pyrolyzed. The spray-pyrolysis may be performed at a temperature ranging from about 500° C. to about 1,200° C. under the inert atmosphere.

The mechanical-dry agglomeration technique may include that the lithium composite compound, the microporous carbon-based material, and the binder are mechanically agglomerated and the resulting mixture is heat-treated. The heat-treatment may be performed at a temperature ranging from about 500° C. to about 1,200° C. under the inert atmosphere.

According to another embodiment of the present invention, a rechargeable lithium battery includes a negative electrode including a negative active material, a positive electrode including the positive active material, and a non-aqueous electrolyte.

The positive electrode may include a positive active material layer including a binder and a conductive material as well as the positive active material and a current collector supporting this layer.

The positive active material layer may include the positive active material in an amount ranging from 90 to 98 wt % based on the entire weight thereof.

The binder improves properties for binding the positive active material particles to one another and with a current collector. Examples of the binder include polyvinyl alcohol, carboxymethyl cellulose, hydroxypropyl cellulose, diacetyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity, and may include any electrically-conductive material unless it causes a chemical change. Examples of the conductive material include carbon-based materials such as natural graphite, artificial graphite, carbon black, acetylene black, ketjen black, carbon fiber, and the like; metal-based materials including a metal powder or a metal fiber of copper, nickel, aluminum, silver, and the like; conductive polymers such as polyphenylene derivatives; or mixtures thereof.

The current collector may be aluminum (Al), but is not limited thereto.

The negative electrode may include a current collector and a negative active material layer on the current collector. The negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbon material. The carbon material may be any generally-used carbon-based negative active material for a lithium ion rechargeable battery. Examples of the carbon material include crystalline carbon, amorphous carbon, and a mixture thereof. The crystalline carbon may be shapeless, or sheet, flake, spherical, or fiber shaped natural graphite or artificial graphite. The amorphous carbon may be a soft carbon, a hard carbon, mesophase pitch carbide, fired coke, and the like.

Examples of the lithium metal alloy includes lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), a Si-Q alloy (where Q is an element selected from the group consisting of an alkaline metal, an alkaline-earth metal, a group 13 element, a group 14 element, a transition element, a rare earth element, and combinations thereof, and is not Si), Sn, $SnO_2$, a Sn—R alloy (where R is an element selected from the group consisting of an alkaline metal, an alkaline-earth metal, a group 13 element, a group 14 element, a transition element, a rare earth element, and combinations thereof, and is not Sn), and mixtures thereof. At least one of these materials may be mixed with $SiO_2$. The elements Q and R are the same or different, and are independently selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide of the following Chemical Formula 1 or 2, or lithium titanium oxide of the following Chemical Formula 3.

$$Li_{x1}V_{y1}M_{d1}O_{2+e1}$$ [Chemical Formula 1]

In Chemical Formula 1, 1≤x1≤2.5, 0.5≤y1≤1.5, 0≤d1≤0.5, 0≤e1≤0.5, and M is selected from Mg, Al, Cr, Mo, Ti, W, Zr, Si, Sc, Cu, Nb, Y, or a combination thereof.

$$Li_{x2}M'_{y2}V_{2-y2}O_{6-z2}$$ [Chemical Formula 2]

In Chemical Formula 2, 0≤x2≤1.2, 0≤y2≤2, −2≤z2≤2, and M' is Mo, Mn, Co, Ni, or a combination thereof.

$$Li_{x3}Ti_{y3-z3}M''_{z3}O_{4-z4}$$ [Chemical Formula 3]

In Chemical Formula 3, 0.6≤x3≤2.5, 1.2≤y3≤2.3, 0≤z3≤0.5, 0≤z4≤0.5, M" is V, Cr, Nb, Fe, Ni, Co, Mn, W, Al, Ga, or a combination thereof.

The negative active material layer may include 95 to 99 wt % of a negative active material based on the total weight of the negative active material layer.

The negative active material layer includes a binder, and optionally a conductive material. The negative active material layer may include about 1 wt % to about 5 wt % of a binder based on the total weight of the negative active material layer. In addition, when the negative active material layer further includes a conductive material, it may include about 90 wt % to about 98 wt % of the negative active material, about 1 wt % to about 5 wt % of the binder, and about 1 wt % to about 5 wt % of the conductive material.

The binder improves properties for binding active material particles with one another and with a current collector. The binder may include a water-insoluble binder, a water-soluble binder, or a combination thereof.

Examples of the water-insoluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamide-imide, polyimide, and a combination thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the binder.

The current collector includes a copper foil, a nickel foil, a stainless steel foil, a titanium foil, a nickel foam, a copper foam, a polymer substrate coated with a conductive metal, or combinations thereof.

The negative active material layer may further include a conductive material. The conductive material may be any conductive material that is generally used for a rechargeable lithium battery. Examples of the conductive material include carbon-based material such as natural graphite, artificial graphite, carbon black, acetylene black, ketjen black, carbon fiber, and the like; a metal-based material including a metal powder or a metal fiber including copper, nickel, aluminum, silver, and the like; a conductive polymer such as polyphenylene derivative, and the like; or a mixture thereof.

The negative and positive electrodes may be fabricated in a method including mixing the active material, a binder, and optionally, a conductive material to provide an active material composition, and coating the composition on a current collector followed by drying and compressing it. The solvent includes N-methylpyrrolidone and the like, but is not limited thereto. The electrode-manufacturing method is well known and thus is not described in detail in the present specification.

The non-aqueous electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethyl acetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent may include a mixture of a cyclic carbonate and a linear carbonate. The cyclic carbonate and the linear carbonate are mixed together in a volume ratio of about 1:1 to about 1:9. When the mixture is used as an electrolyte, the electrolyte performance may be enhanced.

In addition, the non-aqueous organic electrolyte may further include the mixture of a carbonate-based solvent and an aromatic hydrocarbon-based solvent. The carbonate-based solvent and the aromatic hydrocarbon-based solvent may be mixed together in a volume ratio ranging from about 1:1 to about 30:1.

The aromatic hydrocarbon-based organic solvent may be represented by the following Chemical Formula 4.

[Chemical Formula 4]

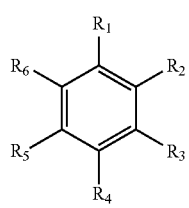

In Chemical Formula 4, $R_1$ to $R_6$ are independently selected from the group consisting of hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The non-aqueous electrolyte may further include vinylene carbonate, an ethylene carbonate-based compound of the following Chemical Formula 5, or a combination thereof in order to improve cycle life of a battery.

[Chemical Formula 5]

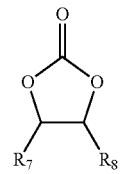

In Chemical Formula 5, $R_7$ and $R_8$ are independently selected from the group consisting of hydrogen, a halogen, a cyano group (CN), a nitro group ($NO_2$), and a C1 to C5 fluoroalkyl group, provided that at least either of $R_7$ and $R_8$ is selected from the group consisting of a halogen, a cyano group (CN), a nitro group ($NO_2$), and a C1 to C5 fluoroalkyl group.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the additive for improving cycle life may be adjusted within an appropriate range.

The lithium salt is dissolved in an organic solvent, supplies lithium ions in the battery, operates basic operation of a rechargeable lithium battery, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate, LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

Figure 2:
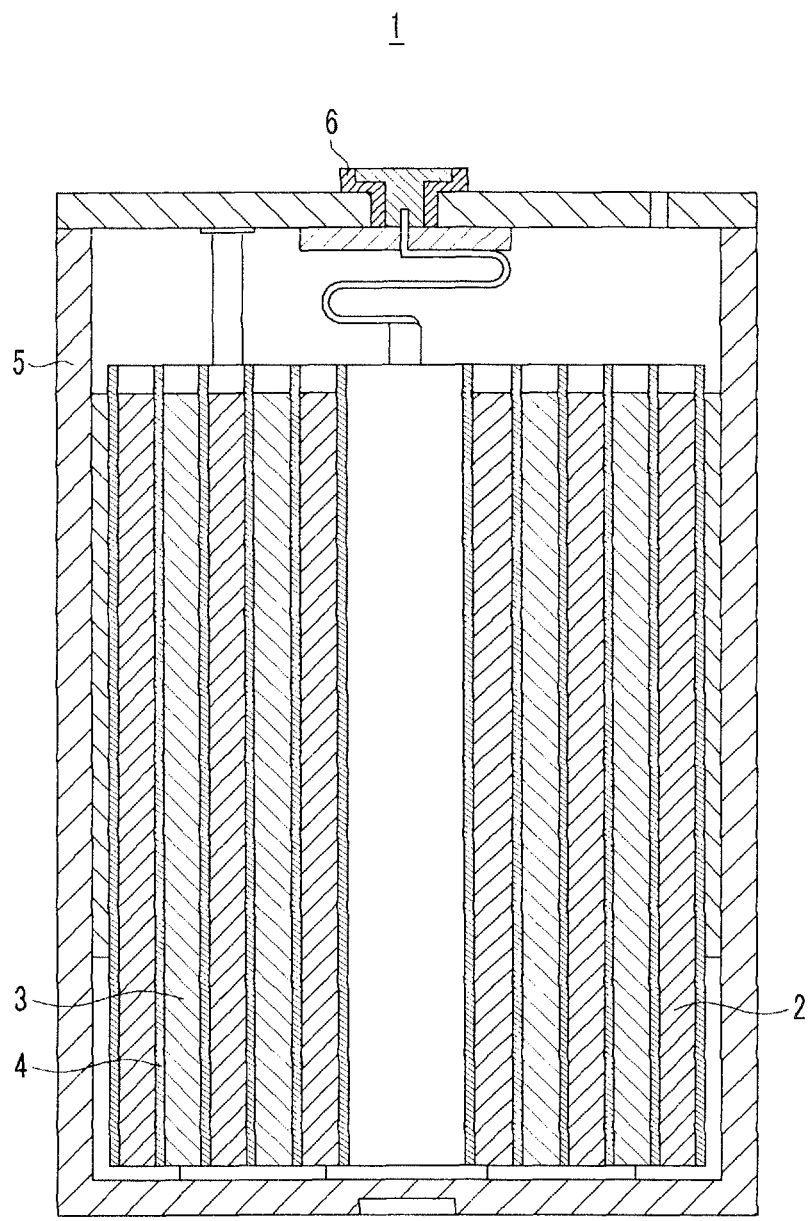
FIG. 2 shows the structure of a rechargeable lithium battery according to one embodiment of the present invention.

FIG. 2 provides a schematic view showing the representative structure of a rechargeable lithium battery according to one embodiment. As shown in FIG. 2, the rechargeable lithium battery 1 includes a battery case 5 including a positive electrode 3, a negative electrode 2, and a separator 4 interposed between the positive electrode 3 and the negative electrode 2, an electrolyte solution impregnated therein, and a sealing member 6 sealing the battery case 5.

The rechargeable lithium battery may further include a separator between the negative electrode and the positive electrode, as needed. Non-limiting examples of suitable separator materials include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

The following examples illustrate the present invention in more detail. These examples, however, are not in any sense to be interpreted as limiting the scope of this disclosure.

Example 1

LiCH$_3$COO and Co(CH$_3$COO)$_2$ (Co:Li=1:1 of a mole ratio) were added to an ethylene glycol aqueous solution in which citric acid was dissolved. The mixture was dried at 150° C. and heat-treated at a temperature of 700° C. for 10 hours in the air, preparing LiCoO$_2$ nanopowder having an average particle size (D50) ranging from about 200 to about 300 nm (Z. S. Peng. C. R. Wan, C. Y. Jiang, J. Power Sources 72 1998 215 which is incorporated herein by reference).

A carbon material having average particle size (D50) of about 5 μm was prepared by grinding green coke (raw coke) prepared by heat-treating petroleum pitch at 500° C. for 10 hours. The D50 is the size at which half of the individual active material particles (by weight) are smaller than the specified diameter.

The prepared carbon material and KOH were mixed in the same ratio. The mixture was heat-treated under a nitrogen atmosphere at about 800° C. The heat-treated product was washed with pure water to prepare porous activated carbon having a specific surface area of 1,350 m$^2$/g and an average particle size (D50) of 5 μm, and then ground to prepare microporous activated carbon having an average particle size (D50) of 1 μm or less.

Then, the LiCoO$_2$ nano powder and the microporous activated carbon were mixed in a weight ratio of 3:1. The mixture was mixed with carbon black in an amount of 0.5 parts by weight based on 100 parts by weight of the mixture. The resulting material was added to 1 L of an aqueous solution in which 20 g of citric acid and 2 g of carboxylmethyl cellulose were dissolved. The final mixture was spray-drying at 80° C. with a previous heated spray-drier, preparing a composite material of LiCoO$_2$ nanopowder and microporous activated carbon.

The composite material was heat-treated at 700° C. in a nitrogen atmosphere tube, preparing a positive active material including a carbon layer on the surface. Herein, the carbon layer was included in an amount of 0.5 wt % based on the entire weight of the positive active material. In addition, LiCoO$_2$ had an average particle size (D50) of about 200 nm in the composite material and was included in an amount of 75 wt %. The microporous activated carbon had an average particle size (D50) of 1 μm or less and a specific surface area of 1350 m$^2$/g, and was included in an amount of 25 wt %.

85 wt % of the positive active material, 5 wt % of a carbon black conductive material, and 10 wt % of a polyvinylidene fluoride binder were dissolved in an N-methyl pyrrolidone solvent, preparing a positive active material slurry. The positive active material slurry was coated on an Al foil current collector, dried, and compressed, preparing a positive electrode.

Example 2

A positive electrode was prepared according to the same method as Example 1, except for LiNi$_{1/3}$Co$_{1/3}$Mn$_{1/3}$O$_2$ powder having a particle diameter of 1 μm instead of the LiCoO$_2$ nanopowder. Herein, the carbon layer was included in an amount of 0.5 wt % based on the entire weight of the positive active material. In addition, LiNi$_{1/3}$Co$_{1/3}$Mn$_{1/3}$O$_2$ had an average particle size (D50) of about 1 μm in the composite material and was included in an amount of 75 wt %. The microporous activated carbon had an average particle size (D50) of <1 μm and a specific surface area of 1350 m$^2$/g, and was included in an amount of 25 wt %.

Comparative Example 1

85 wt % of a LiCoO$_2$ positive active material having an average particle size (D50) of 10 μm, a carbon black conductive material at 5 wt %, and a polyvinylidene fluoride binder at 10 wt % were mixed in an N-methylpyrrolidone solvent, preparing a positive active material slurry. The positive active material slurry was coated on an Al foil current collector and then dried and compressed in a common method, preparing a positive electrode.

Comparative Example 2

LiCoO$_2$ having an average particle size (D50) of 10 μm was mixed with activated carbon in a weight ratio of 9:1. The mixture was used as a positive active material. 85 wt % of the positive active material, 5 wt % of a carbon black conductive material, and 10 wt % of a polyvinylidene fluoride binder were mixed in an N-methyl pyrrolidone solvent, preparing a positive active material slurry. The positive active material slurry was coated on an Al foil current collector and then dried and compressed in a common method, preparing a positive electrode.

Comparative Example 3

A positive electrode was prepared according to the same method as Comparative Example 2, except for using a mixture of LiCoO$_2$ having an average particle size (D50) of 10 μm and activated carbon in a weight ratio of 8:2.

Comparative Example 4

A positive electrode was prepared according to the same method as Comparative Example 2, except for using a mixture of LiCoO$_2$ nanopowder having an average particle size (D50) of about 200 nm according to Example 1 with activated carbon having an average particle size (D50) of 10 μm in ratio of 9:1 as a positive active material.

The positive electrodes according to Examples 1 and 2 and Comparative Examples 1 to 4 were used with a lithium metal as a counter electrode, fabricating a coin-type half-cell. Herein, an electrolyte solution was prepared by mixing ethylene carbonate in which 1M LiPF$_6$ was dissolved, dimethyl carbonate, and diethyl carbonate in a volume ratio of 3:3:4.

The half-cell was charged and discharged at a 0.2 C rate under a 3V cut-off charge and a 4.3V cut-off discharge condition. After the half-cell was charged and discharged once, its discharge capacity was provided as a 0.2 C capacity in the following Table 1.

In addition, the half-cell was charged and discharged, changing its charge and discharge speed to 1 C, 5 C, 30 C, and 50 C. The charge and discharge capacity percentages were respectively calculated at 5 C, 30 C, and 50 C against 10, and are provided in the following Table 1 as charge efficiency and discharge efficiency. In addition, the cell was charged and discharged 100 times at a 6 C rate. Then, its cycle-life was evaluated by calculating a percentage of the discharge capacity at the 100th charge and discharge against the discharge capacity at the first charge and discharge. The following Table 1 shows the results.

TABLE 1

|  | 0.2 C capacity | Discharge efficiency (%) | | | Charge efficiency (%) | | | Cycle life (%) |
| --- | --- | --- | --- | --- | --- | --- | --- | --- |
|  | (mAh/g) | 5 C/1 C | 30 C/1 C | 50 C/1 C | 5 C/1 C | 30 C/1 C | 50 C/1 C |  |
| Example 1 | 143 | 84 | 58 | 47 | 96 | 76 | 58 | 83 |
| Example 2 | 148 | 87 | 59 | 46 | 97 | 82 | 62 | 86 |
| Comparative Example 1 | 153 | 72 | 19 | — | 95 | 25 | — | 21 |
| Comparative Example 2 | 143 | 80 | 47 | 29 | 94 | 66 | 47 | 75 |
| Comparative Example 3 | 128 | 82 | 50 | 33 | 96 | 73 | 43 | 72 |
| Comparative Example 4 | 142 | 82 | 49 | 32 | 95 | 66 | 40 | 73 |

As shown in Table 1, the cells including an active material according to Examples 1 and 2 had good high rate charge and discharge characteristics, but the ones of Comparative Examples 1 to 4 had deteriorated high rate characteristics.

In particular, the cell of Comparative Example 1 had the highest capacity at 0.2 C but the capacity at a 50 C high rate charge and discharge was not be detected. Accordingly, the result indicated that it cannot be used at a high rate. The $LiCoO_2$ positive active material included in Comparative Example 1 had high resistance against intercalation and deintercalation of ions and thus had the worst result at a high rate.

The positive active materials of Examples 1 and 2 had improved high rate characteristics, since lithium ions can rapidly intercalate and deintercalate through the assemblage of microporous activated carbon and a nano-lithium composite compound, and thus decreased a resistance component.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A positive active material for a rechargeable lithium battery, comprising:
a composite material comprised of a microporous carbon-based material and a lithium composite compound formed by agglomerating the microporous carbon-based material and the lithium composite compound wherein the composite material comprises secondary particles comprising smaller primary particles of the microporous carbon-based material and the lithium composite compound agglomerated together, and the primary particles have an average particle size (D50) of 1 micrometer or less; and
a carbon layer disposed partially or entirely on the surface of the secondary particles of the composite material, wherein
the microporous carbon-based material comprises one of activated carbon, carbide derived carbon (CDC), expanded carbon, expanded graphite and a combination thereof, has an average particle size (D50) ranging from 100 nm or more and less than 1 μm, and has a specific surface area ranging from 50 $m^2/g$ to 3000 $m^2/g$;
the lithium composite compound comprising $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_bMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0<g≤0.5); wherein A in the above formulae being selected from the group consisting of Ni, Co, Mn, and a combination thereof; X in the above formulae being selected from the group consisting of Al, Ni, Mn, Cr, Fe, Mg, Sr, V, a rare earth element, and a combination thereof; D in the above formulae being selected from the group consisting of O, F, S, P, and a combination thereof; E in the above formulae being selected from the group consisting of Co, Mn, and a combination thereof; T in the above formulae being selected from the group consisting of F, S, P, and a combination thereof; G in the above formulae being selected from the group consisting of Al, Cr, Mn, Fe, Mg, La, Ce, Sr, V, and a combination thereof;
the lithium composite compound and the microporous carbon-based material is mixed in a ratio ranging from 99:1 wt % to 70:30 wt %; and
the carbon layer is about 1 nm to about 500 nm thick.

2. The positive active material of claim 1, the lithium composite compound having an average particle size (D50) ranging from 100 nm to 1 μm.

3. The positive active material of claim 1, the positive active material further comprising a conductive material.

4. The positive active material of claim 3, the conductive material being one of carbon black, carbon nanotubes, carbon nanofiber, vapor-grown carbon fiber (VGCF), carbon powder, graphite powder and a combination thereof.

5. The positive active material of claim 3, the conductive material being in an amount of 1 to 5 parts by weight based on 100 parts by weight of the composite material.

6. A rechargeable lithium battery comprising:
a negative electrode comprising a negative active material;
a positive electrode comprising a positive active material comprising a composite material comprised of a microporous carbon-based material and a lithium composite compound formed by agglomerating the microporous carbon-based material and the lithium composite compound wherein the composite material comprises secondary particles comprising smaller primary particles of the microporous carbon-based material and the lithium composite compound agglomerated together, and the primary particles have an average particle size (D50) of 1 micrometer or less; and a carbon layer partially or entirely disposed partially or entirely on the surface of the secondary particles of the composite material; and
a non-aqueous electrolyte, wherein
the microporous carbon-based material comprises one of activated carbon, carbide derived carbon (CDC), expanded carbon, expanded graphite and a combination thereof, has an average particle size (D50) ranging from 100 nm or more and less than 1 μm, and has a specific surface area ranging from 50 $m^2/g$ to 3000 $m^2/g$;
the lithium composite compound comprising $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_bMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 < g \leq 0.5$); wherein A in the above formulae being selected from the group consisting of Ni, Co, Mn, and a combination thereof; X in the above formulae being selected from the group consisting of Al, Ni, Mn, Cr, Fe, Mg, Sr, V, a rare earth element, and a combination thereof; D in the above formulae being selected from the group consisting of O, F, S, P, and a combination thereof; E in the above formulae being selected from the group consisting of Co, Mn, and a combination thereof; T in the above formulae being selected from the group consisting of F, S, P, and a combination thereof; G in the above formulae being selected from the group consisting of Al, Cr, Mn, Fe, Mg, La, Ce, Sr, V, and a combination thereof;
the lithium composite compound and the microporous carbon-based material being mixed in a ratio ranging from 51:49 wt % to 99:1 wt %; and
the carbon layer is about 1 nm to about 500 nm thick.

7. The rechargeable lithium battery of claim 6, the lithium composite compound having an average particle size (D50) ranging from 100 nm to 1 μm.

8. The rechargeable lithium battery of claim 6, the positive active material further comprising a conductive material.

9. The rechargeable lithium battery of claim 8, the conductive material being one of carbon black, carbon nanotubes, carbon nanofiber, vapor grown carbon fiber (VGCF), carbon powder, graphite powder and a combination thereof.

10. The rechargeable lithium battery of claim 8, the conductive material being comprised in an amount of 1 to 5 parts by weight based on 100 parts by weight of the composite material.

* * * * *